United States Patent
Ha et al.

(10) Patent No.: US 9,921,744 B2
(45) Date of Patent: *Mar. 20, 2018

(54) TEXT INPUT METHOD IN TOUCH SCREEN TERMINAL AND APPARATUS THEREFOR

(71) Applicant: Samsung Electronics Co., Ltd., Gyeonggi-do (KR)

(72) Inventors: Tae-Gon Ha, Seoul (KR); Hairong Zhang, Guangzhou (CN)

(73) Assignee: SAMSUNG ELECTRONICS CO., LTD., Suwon-si, Gyeonggi-Do (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/399,629

(22) Filed: Jan. 5, 2017

(65) Prior Publication Data

US 2017/0115875 A1   Apr. 27, 2017

Related U.S. Application Data

(63) Continuation of application No. 13/678,323, filed on Nov. 15, 2012, now Pat. No. 9,569,091.

(30) Foreign Application Priority Data

Nov. 15, 2011 (KR) .................. 10-2011-0118958

(51) Int. Cl.
*G06F 3/0488* (2013.01)
*G06F 3/01* (2006.01)

(52) U.S. Cl.
CPC .......... *G06F 3/04883* (2013.01); *G06F 3/018* (2013.01); *G06F 3/04886* (2013.01)

(58) Field of Classification Search
CPC .... G06F 3/018; G06F 3/0488; G06F 3/04883; G06F 3/04886
See application file for complete search history.

(56) References Cited

U.S. PATENT DOCUMENTS

| | | | |
|---|---|---|---|
| 7,369,702 B2 | 5/2008 | Abdulkader et al. |
| 8,537,129 B2 | 9/2013 | Adamson et al. |
| 8,547,354 B2 | 10/2013 | Koch et al. |
| 2006/0033719 A1 | 2/2006 | Leung et al. |
| 2006/0044259 A1 | 3/2006 | Hotelling |

(Continued)

FOREIGN PATENT DOCUMENTS

| | | |
|---|---|---|
| CN | 101118472 A | 2/2008 |
| CN | 101620480 A | 1/2010 |

(Continued)

OTHER PUBLICATIONS

Third Non-Final Office Action dated Apr. 6, 2016 in connection with U.S. Appl. No. 13/678,323; 13 pages.

(Continued)

*Primary Examiner* — Xuemei Zheng

(57) ABSTRACT

A method and an apparatus input test in a touch screen terminal. The method comprises designating a certain region on a keyboard interface picture, not permitting text input through a keyboard when touch drag started from the designated region is sensed and acquiring a path of the touch drag, acquiring a path of following touch drag when at least the one or more following touch drag are sensed, and reading out at least the acquired one or more paths by cursive character recognition, deducing a character, determining the deduced character as an input target, and permitting the text input through the keyboard.

10 Claims, 4 Drawing Sheets

(56) References Cited

U.S. PATENT DOCUMENTS

| | | |
|---|---|---|
| 2007/0075978 A1 | 4/2007 | Chung |
| 2007/0091070 A1 | 4/2007 | Larsen |
| 2007/0097095 A1 | 5/2007 | Kim et al. |
| 2011/0246927 A1 | 10/2011 | Im |
| 2012/0056814 A1 | 3/2012 | Sudo |
| 2012/0113023 A1 | 5/2012 | Koch et al. |
| 2012/0242579 A1 | 9/2012 | Chua |

FOREIGN PATENT DOCUMENTS

| | | |
|---|---|---|
| CN | 102033682 A | 4/2011 |
| CN | 102193736 A | 9/2011 |
| KR | 10-2000-0024489 A | 5/2000 |
| KR | 10-2001-0096061 A | 11/2001 |
| KR | 10-2006-0135056 A | 12/2006 |
| KR | 10-2011-0072818 A | 6/2011 |
| KR | 10-2011-0072819 A | 6/2011 |

OTHER PUBLICATIONS

Third Office Action dated Mar. 23, 2016 in connection with Chinese Patent Application No. 2012104281185; 27 pages.
Second Final Office Action dated Nov. 16, 2015 in connection with U.S. Appl. No. 13/678,323; 12 pages.
Second Non-Final Office Action dated Jun. 29, 2015 in connection with U.S. Appl. No. 13/678,323; 12 pages. pages.
Second Office Action dated Sep. 22, 2015 in connection with Chinese Patent Application No. 2012104281185; 28 pages.
First Office Action dated Feb. 3, 2015 in connection with Chinese Patent Application No. 2012104281185; 31 pages.
First Final Office Action dated Jan. 12, 2015 in connection with U.S. Appl. No. 13/678,323; 14 pages. pages.
First Non-Final Office Action dated Jul. 24, 2014 in connection with U.S. Appl. No. 13/678,323; 18 pages. pages.
Communication from a foreign patent office in a counterpart foreign application, Korean Intellectual Property Office, "Notice of Preliminary Rejection," Application No. KR 10-2011-0118958, dated Aug. 23, 2017, 9 pages.

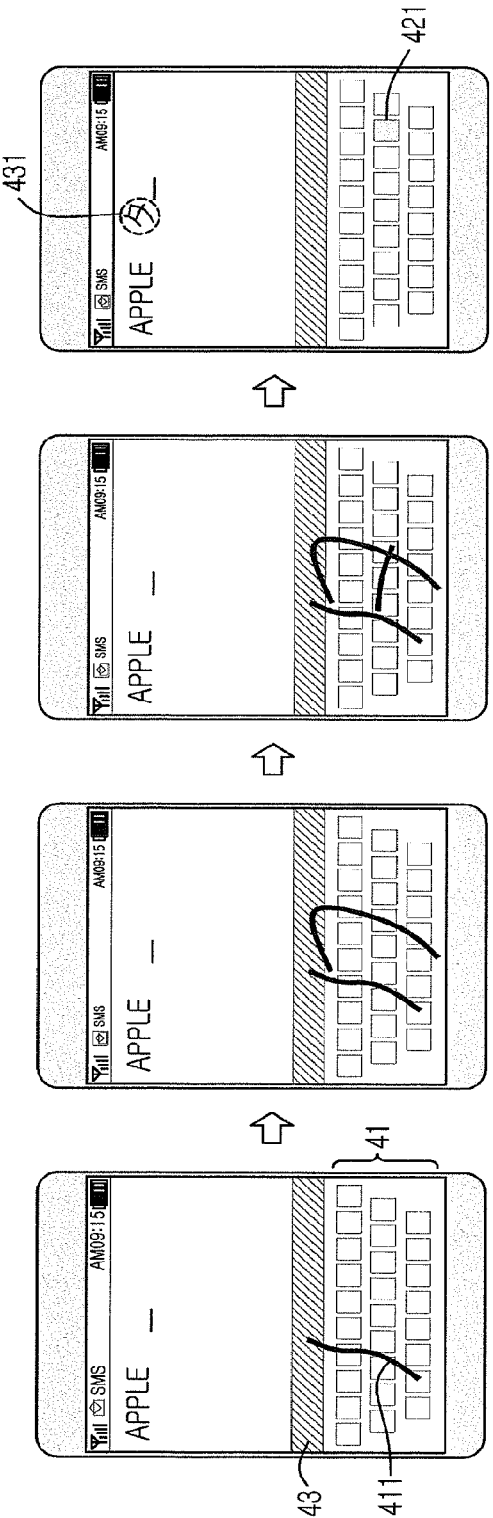

TEXT INPUT METHOD IN TOUCH SCREEN TERMINAL AND APPARATUS THEREFOR

CROSS-REFERENCE TO RELATED APPLICATION(S) AND CLAIM OF PRIORITY

The present is related to and is a continuation of U.S. patent application Ser. No. 13/678,323, filed Nov. 15, 2012, which claims the benefit under 35 U.S.C. § 119(a) to a Korean patent application filed in the Korean Intellectual Property Office on Nov. 15, 2011 and assigned Serial No. 10-2011-0118958, the entire disclosure of which is hereby incorporated by reference.

TECHNICAL FIELD OF THE INVENTION

The present disclosure relates to a text input method in a touch screen terminal and an apparatus therefor.

BACKGROUND OF THE INVENTION

Portable terminals such as mobile terminals (cellular phones), electronic schedulers, and personal complex terminals have become necessities of current society based on development of electronic communication industries. The portable terminals have developed into important means of information transmission, which are quickly changed.

As everyone knows, recently, because utilization of a touch screen portable terminal is enhanced, the trend in a text input type is toward a text input method through a touch screen.

FIG. 1 illustrates interface pictures for text input in a conventional touch screen portable terminal.

Referring to FIG. 1, the touch screen portable terminal provides a keyboard interface picture and a cursive character recognition interface picture. The keyboard interface picture includes a keyboard 11 and an input window 13 for displaying characters received through the keyboard 11. Also, the cursive character recognition interface picture includes a cursive character recognizer 14 for receiving touch drag and an input window 15 for reading out the touch drag and displaying a deduced character.

In general, a user must convert and use the keyboard interface picture and the cursive character recognition interface picture. Therefore, this results in an inconvenience to the user.

SUMMARY OF THE INVENTION

To address the above-discussed deficiencies of the prior art, it is a primary object to provide a method and apparatus for permitting text input using a keyboard and cursive character recognition.

Another aspect of the present disclosure is to provide a method and apparatus for permitting text input using cursive character recognition on a keyboard interface display or picture.

In accordance with an aspect of the present disclosure, a text input method in a touch screen terminal is provided. The text input method includes designating a certain region on a keyboard interface display or picture, not permitting text input through a keyboard when touch drag started from the designated region is sensed and acquiring a path of the touch drag, acquiring a path of following touch drag when at least the one or more following touch drag are sensed, and reading out at least the acquired one or more paths by cursive character recognition, deducing a character, determining the deduced character as an input target, and permitting the text input through the keyboard.

In accordance with another aspect of the present disclosure, a text input apparatus in a touch screen terminal is provided. The text input apparatus includes a controller for designating a certain region on a keyboard interface display or picture, not permitting text input through a keyboard when touch drag started from the designated region is sensed, and acquiring a path of the touch drag, wherein the controller acquires a path of following touch drag when at least the one or more following touch drag is sensed and wherein the controller reads out at least the acquired one or more paths by cursive character recognition, deduces a character, determines the deduced character as an input target, and permits the text input through the keyboard.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4A to 4E illustrate interface displays or pictures for text input according to various embodiments of the present disclosure.

DETAILED DESCRIPTION OF THE INVENTION

FIGS. 2 through 4E, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Exemplary embodiments of the present disclosure will be described herein below with reference to the accompanying drawings. In the following description, well-known functions or constructions are not described in detail since they would obscure the invention in unnecessary detail. Also, the terms used herein are defined according to the functions of the present disclosure. Thus, the terms may vary depending on user's or operator's intension and usage. That is, the terms used herein must be understood based on the descriptions made herein.

The present disclosure described hereinafter relates to a method and apparatus for permitting text input using a keyboard and cursive character recognition without converting an interface picture.

Figure 1:
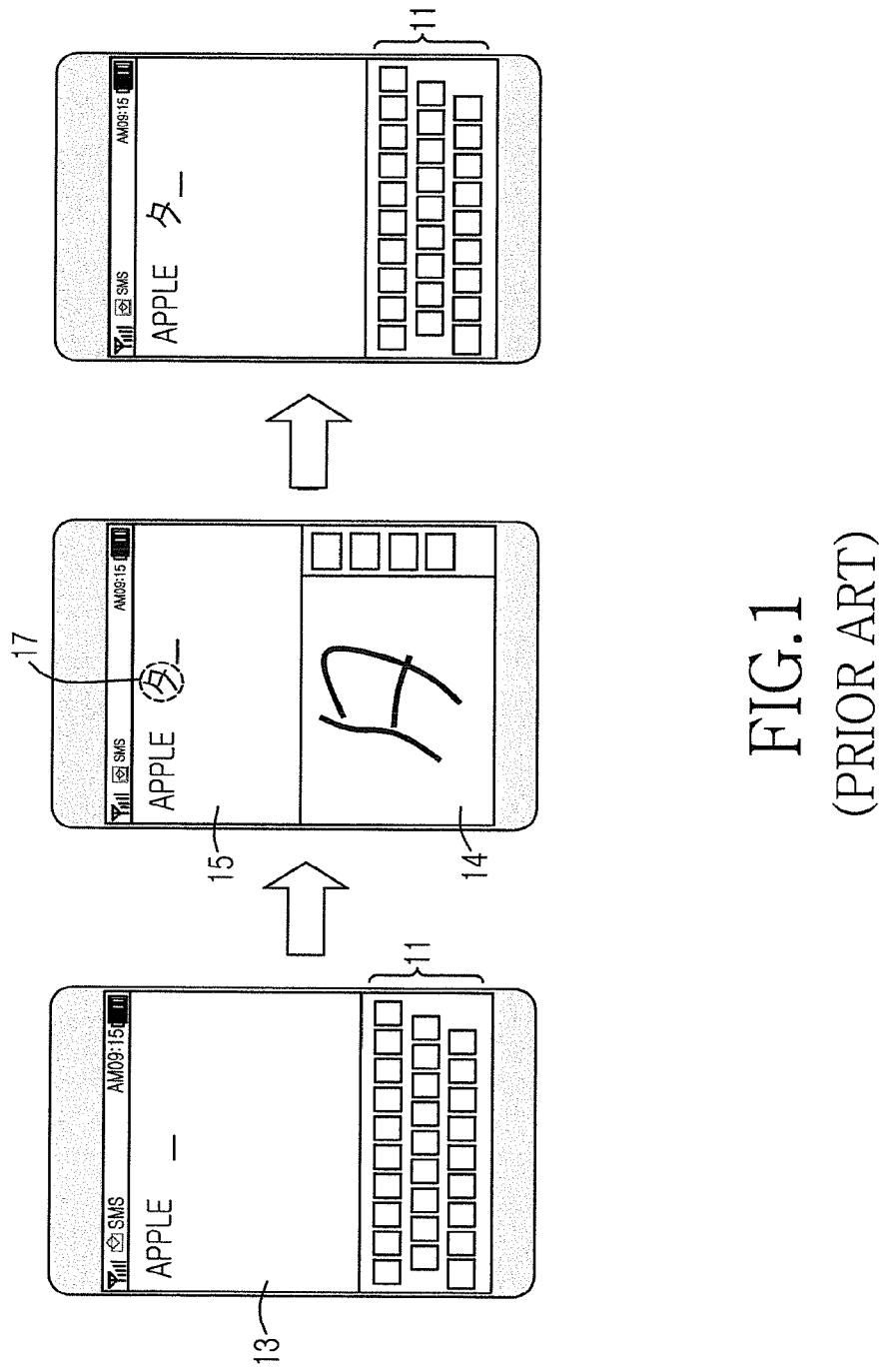
FIG. 1 illustrates interface pictures for text input in a conventional touch screen portable terminal.
Figure 2:
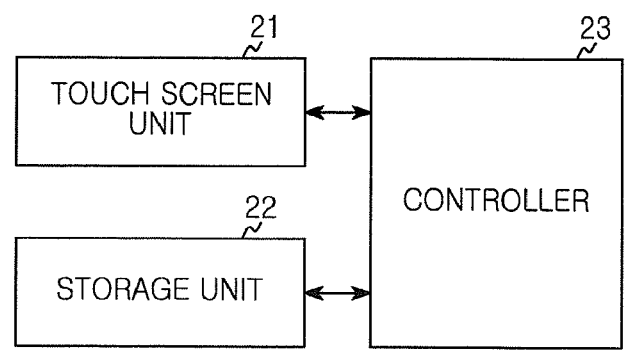
FIG. 2 illustrates a block diagram of a portable terminal according to one embodiment of the present disclosure.

FIG. 2 illustrates a block diagram of a portable terminal according to one embodiment of the present disclosure.

Referring to FIG. 2, the portable terminal includes a touch screen unit 21, a storage unit 22, and a controller 23.

The touch screen unit 21 receives an output signal and outputs the received output signal as an image under control of the controller 23. In addition, the touch screen unit 21 receives touch of a user and outputs an input signal to the controller 23. The controller 23 performs an operation according to the input signal.

The storage unit 22 stores programs for controlling an overall operation of the portable terminal and a variety of data items input and output when a control operation of the portable terminal is performed.

The controller 23 controls an overall operation of the portable terminal.

Hereinafter, a method of inputting characters in the controller 23 according to one embodiment of the present disclosure will be described in detail.

Figure 3:
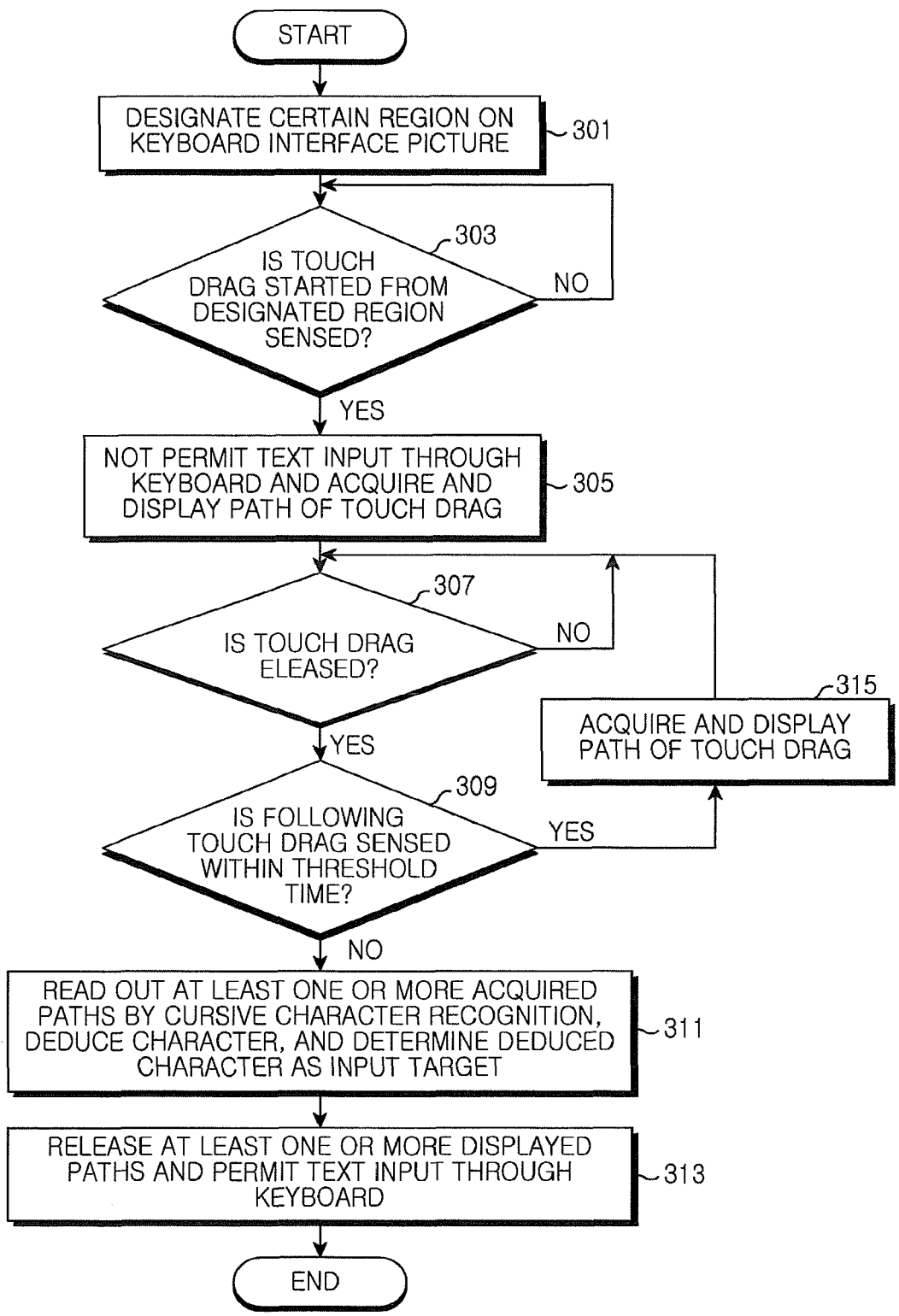
FIG. 3 illustrates a process of inputting characters according to one embodiment of the present disclosure.

FIG. 3 illustrates a process of inputting characters according to one embodiment of the present disclosure.

Referring to FIG. 2 and FIG. 3, the controller 23 designates a certain region on a keyboard interface display or picture in step 301. The controller 23 may allow a user to determine a range or position of the region.

When touch drag started from the designated region is sensed in step 303, the controller 23 proceeds to step 305, does not permit text input through a keyboard, and acquires and displays a path of the touch drag. For example, the touch drag started from the designated region may or may not be gotten out of the designated region.

When release of the touch drag is sensed in step 307, the controller 23 proceeds to step 309 and verifies whether there is following touch drag within a threshold time. When the following touch drag is sensed within the threshold time in step 309, the controller 23 proceeds to step 315 and acquires and displays a path of the following touch drag. The controller 23 performs the processing from step 307.

When the following touch drag is no longer sensed within the threshold time in step 309, the controller 23 proceeds to step 311, reads out at least the one or more acquired paths by cursive character recognition, deduces a character, and determines the deduced character as an input target. For example, the controller 23 displays the deduced character on an input window of the keyboard interface display or picture in step 311.

The controller 23 releases at least the one or more displayed paths and permits text input through the keyboard in step 313.

When the path of the touch drag is displayed, the controller 23 displays the path of the touch drag on the keyboard interface picture. For example, the controller 23 may display the path of the touch drag on an overlay display or picture or may display the path of the touch drag on the keyboard interface display or picture itself.

FIG. 4A to 4E illustrate interface displays or pictures for text input according to various embodiments of the present disclosure.

Referring to FIG. 2 and FIG. 4A to 4E, the controller 23 provides a keyboard 41 and an input window 42 for displaying characters input through the keyboard 41. In addition, the controller 23 provides a designated region 43 arranged with the keyboard 41 and the input window 42.

As shown (a) of FIG. 4, a user starts touch drag 411 from the designated region 43. The controller 23 does not permit text input through a keyboard and performs cursive character recognition.

As shown (a) to (c) of FIG. 4, when the cursive character recognition is performed, the controller 23 acquires at least one or more paths of the touch drag, reads out the acquired paths, and deduces a character. The controller 23 acquires at least one or more paths of the touch drag until the previous touch drag is released and there are no longer touch drag within a threshold time. Particularly, the controller 23 displays a sensed path of the touch drag on a picture of the display of the keyboard 41, the input window 42, and the designated region 43. After (a) of FIG. 4, the controller 23 provides the entire picture as a region of the touch drag for the cursive character recognition.

As shown in (d) of FIG. 4, when there is no longer touch drag within the threshold hold after the previous touch drag is released, the controller 23 reads out at least the one or more acquired paths, deduces the character, and displays the deduced character 431 on the input window 42. In addition, the controller 23 permits text input through the keyboard 41 again. As shown (d) and (e) of FIG. 4, when a button 421 is touched, the controller 23 displays a mapped corresponding character 432 on the input window 42.

In conclusion, because text input using cursive character recognition is permitted on a keyboard interface picture, a text input method and an apparatus therefor according to one embodiment of the present disclosure solve the trouble of converting the keyboard interface display or picture into the cursive character recognition interface picture or converting the cursive character recognition interface picture into the keyboard interface picture.

It will be appreciated that embodiments of the present invention according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present disclosure has been particularly shown and described with reference to exemplary embodiments thereof, it will be understood by those skilled in the art that various changes in form and details may be made therein without departing from the spirit and scope of the present disclosure as defined by the appended claims.

What is claimed is:

1. An electronic device comprising:
   a touch screen; and
   a controller configured to:
      provide a user interface on the touch screen having an input window and a keyboard,
      detect whether a touch input is started from the keyboard or a region outside the keyboard,
      in response to detecting the touch input starting from the keyboard, identify a first character on the keyboard that corresponds to the detected touch input,
      in response to detecting the touch input starting from the region outside the keyboard, disable a text input mode through the keyboard to allow the touch input to extend into the keyboard, acquire at least one or more paths of the detected touch input, and identify a second character using character recognition based on the acquired one or more paths, and
      input the first or second character in the input window.

2. The electronic device of claim 1, wherein the controller is configured to maintain a form of the keyboard while a handwriting input mode is enabled.

3. The electronic device of claim 1, wherein the controller is configured to maintain a character key of the keyboard while the text input mode is disabled.

4. The electronic device of claim 1, wherein the controller is configured to, in response to detecting the touch input starting from the region outside an English keyboard,
   disable the text input mode through the English keyboard,
   recognize a Chinese character as the second character using character recognition based on the acquired one or more paths, and
   enable the text input mode to receive another touch input corresponding to at least one key of the English keyboard after the inputting of the second character.

5. The electronic device of claim 1, wherein the controller is configured to determine a range or position of the touch input in the region outside the keyboard.

6. The electronic device of claim 1, wherein the controller is configured to determine an entire display area of the touch screen as the region for character recognition.

7. An electronic device, comprising:
   a touch screen; and
   a processor configured to:
      provide a user interface on the touch screen having an input window and a keyboard,
      in response to a touch input starting from a region outside the keyboard, enable a handwriting input mode and disable a text input mode through the keyboard to allow the touch input to extend into the keyboard,
      while in the handwriting input, acquire one or more paths of the touch input, and identify a first character using character recognition based on the acquired one or more paths, and
      input the first character in the input window.

8. The electronic device of claim 7, wherein, after the first character is identified, the processor is configured to disable the handwriting input mode and enable the text input mode through the keyboard, and
   while the text input mode through the keyboard is enabled, and in response to a touch input starting from the keyboard, the processor is configured to identify a second character on the keyboard that corresponds to the touch input, and input the second character in the input window.

9. The electronic device of claim 7, wherein the processor is configured to maintain an image of the keyboard while the handwriting input mode is enabled.

10. The electronic device of claim 7, wherein the processor is configured to use both an area of the keyboard and the region outside the keyboard of the touch screen as a region for receiving one or more paths of the touch input for character recognition.

* * * * *